J. W. BURNHAM & W. CONLON.
POTATO DIGGER.

No. 78,257.

Patented May 26, 1868.

Witnesses:
Theo Insche.
J. A. Fraser.

Inventors.
J. W. Burnham
W. Conlon
Per Munn & Co.

United States Patent Office.

JOHN W. BURNHAM AND WILSON CONLON, OF MIDDLETOWN POINT, NEW JERSEY.

Letters Patent No. 78,257, dated May 26, 1868.

IMPROVEMENT IN POTATO-DIGGER.

*The Schedule referred to in these Letters Patent and making part of the same.*

---

TO ALL WHOM IT MAY CONCERN:

Be it known that we, JOHN W. BURNHAM and WILSON CONLON, of Middletown Point, in the county of Monmouth, and State of New Jersey, have invented a new and improved Potato-Digger; and we do hereby declare that the following is a full, clear, and exact description thereof, which will enable those skilled in the art to make and use the same, reference being had to the accompanying drawings, forming part of this specification, in which—

Figure 1:
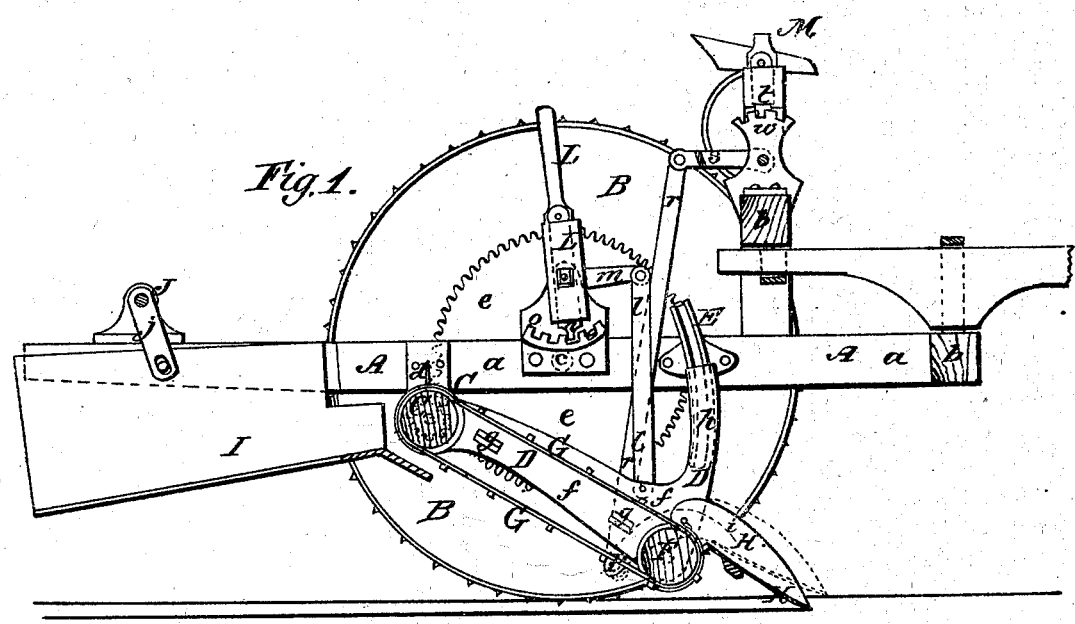
Figure 2:
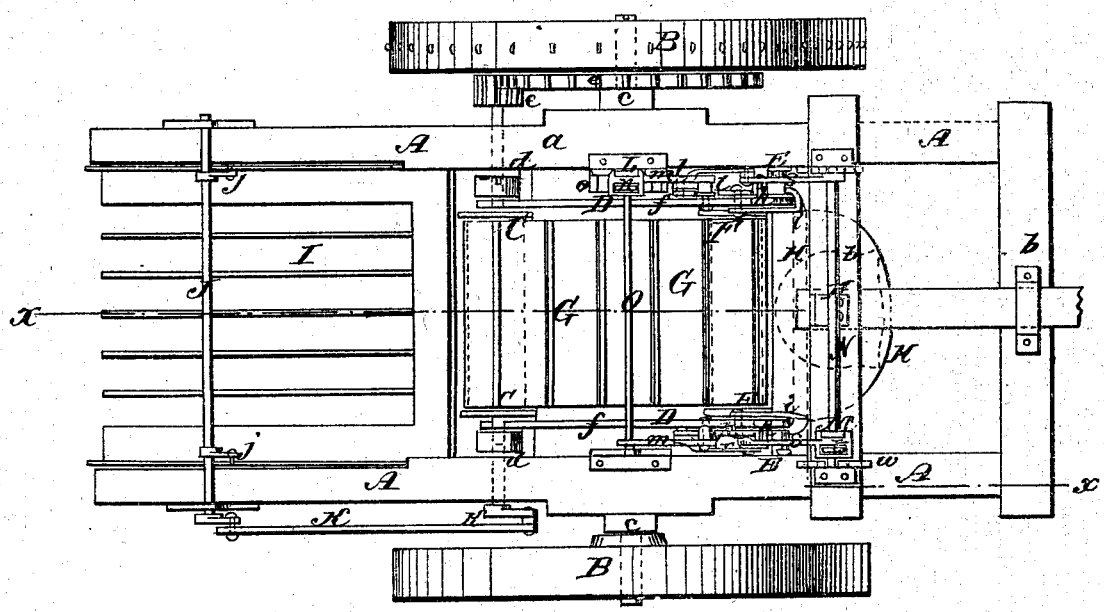

Figure 1 represents a vertical longitudinal section of our invention, taken in the line x x, fig. 2.
Figure 2 is a plan or top view of the same.
Similar letters of reference indicate corresponding parts.

This invention relates to a new potato-digger, which is so arranged that the scoop may be placed at any desired angle, and may be raised and lowered at will, independent of the frame to which the lower roller, holding the endless apron, is secured, although the latter frame may also be raised or lowered at will.

The invention consists in the devices for raising the apron and scoop, and the scoop alone; also in the construction of the frame in which the lower apron-roller has its bearings.

A represents the main frame of the machine.

The same consists of two longitudinal bars a, and of two or more cross-bars b b', as shown.

From the sides of the bars a project short pins c, which receive the driving-wheels B B, no main axle being employed in this machine.

C is a roller, having its bearings in the bars a, or in plates d, projecting from the same.

It receives rotary motion by means of gear-wheels e, or their equivalents, from one of the wheels B.

A frame, D, consisting of two side-plates f f, and suitable braces g g, is suspended from the roller C, so that it can turn around the same, and has, at its lower end, curved projections h, which move in curved guides E E, that are secured to the frame A.

The curves h and E are described from the axis of the roller C as their centre.

In the lower part of the frame D is hung a horizontal roller, F, as shown.

An endless apron, G, is laid around the rollers C and F, as shown.

H is a scoop, having flanges i i at the sides, said flanges being pivoted to the side-plates f of the frame D.

I is a shaking-frame, suspended, behind the upper end of the apron, from cranks j j of an axle, J, which receives oscillating motion by means of a rod, k, from the axle C.

A shaking motion is thus imparted to the sieve or grate-frame I.

The operation of the machine is simple and easy understood.

As it is being drawn ahead, the scoop raises the potatoes and the dirt, and conveys them to the apron, by which they are raised and thrown upon the frame I, which separates the potatoes from the dirt, and discharges the former either into a suitable receptable riding behind the machine, or upon the top of the furrows, whence they can be easily picked up.

The frame D is, by means of a bar, l, connected with an arm, m, that projects from a lever, L, which is pivoted to a plate projecting from the frame A.

The lever L carries a bolt, n, which can be pushed between the teeth of a ratchet, o, and thus the lever can be locked in any desired position.

When the lever L is unlocked, it can be turned so as to raise or lower the frame D, thereby varying at will the height of the axle F, and of the pivots of the scoop, and, consequently, also, the inclination of the apron G.

From one flange i of the scoop H projects an arm, p, which is, by means of a lever, r, connected with an arm, s, projecting from a lever, M, which is pivoted to a plate projecting from the frame A.

The lever M carries a bolt, t, which can be pushed between the teeth of a ratchet, w, as shown, and thus the lever can be locked in any desired position.

When the lever M is unlocked, it can be turned so as to turn the scoop H around its pivot, to regulate the position of the scoop without interfering with the position of the frame D and apron G.

Instead of being thus simply connected with the scoop H, the lever M may be connected with a horizontal shaft, N, from each end of which bars S S project, so that greater security of operation is obtained.

In a similar manner may the lever L be connected with a shaft, O, which carries an arm, $m$, at each end, as shown in fig. 2.

We claim as new, and desire to secure by Letters Patent—

1. Connecting the oscillating-frame D, which carries the lower apron-roller F and the scoop H, by means of a rod and crank, with a lever, L, so that the position of the apron and scoop can be adjusted at once, as set forth.

2. The arrangement and combination, with each other, of the roller C, oscillating-frame D, roller F, apron G, scoop H, rods $l$ $m$ and $r$ $s$, and levers L and M, all made and operating substantially as herein shown and described.

3. Providing the lower part of the frame D, which carries the endless apron and the scoop, with curved projections $h$ $h$, moving in curved guides E E, as set forth.

JOHN W. BURNHAM,
WILSON CONLON.

Witnesses:
THOMAS MOFFETT,
JOHN LAYTON.